Figure 1:
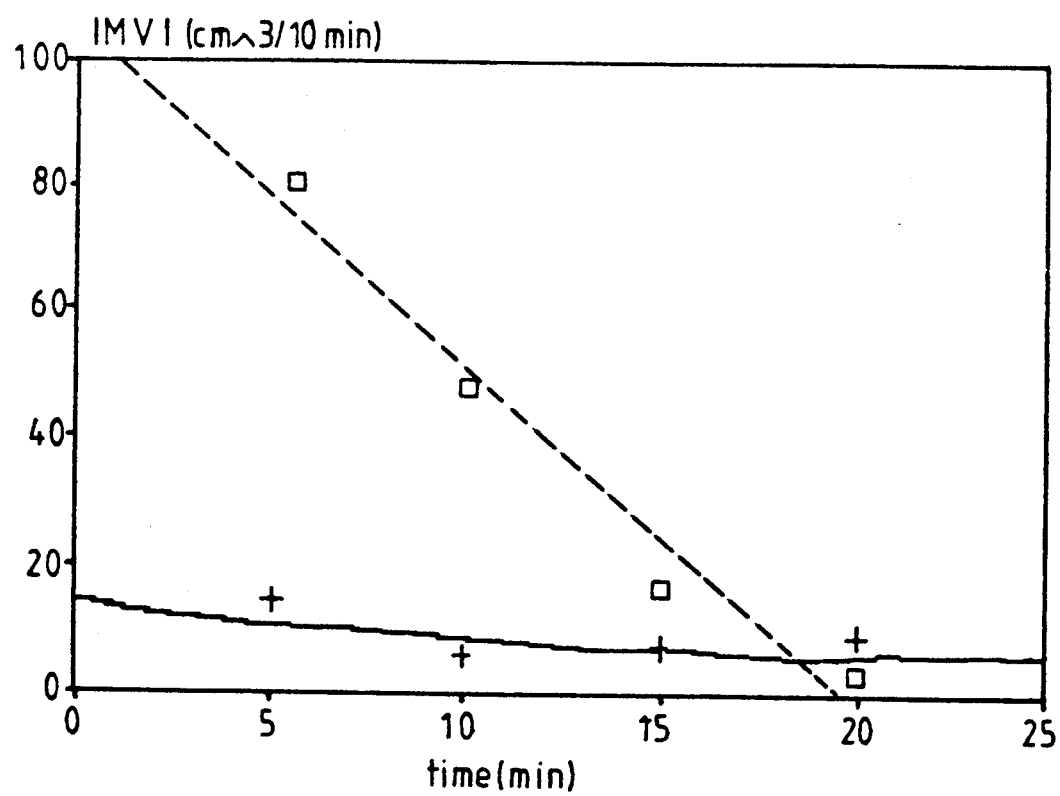

United States Patent [19]

Jonas et al.

[11] Patent Number: 5,006,641
[45] Date of Patent: Apr. 9, 1991

[54] PROCESS FOR THE PREPARATION OF POLYHYDANTOINS WHICH CAN BE PROCESSED THERMOPLASTICALLY

[75] Inventors: Friedrich Jonas, Aachen; Rudolf Merten, Leverkusen, both of Fed. Rep. of Germany

[73] Assignee: Bayer Aktiengesellschaft, Leverkusen, Fed. Rep. of Germany

[21] Appl. No.: 478,408

[22] Filed: Feb. 12, 1990

[30] Foreign Application Priority Data

Feb. 24, 1989 [DE] Fed. Rep. of Germany ....... 3905792
Apr. 27, 1989 [DE] Fed. Rep. of Germany ....... 3913856

[51] Int. Cl.$^5$ ............................................. C08G 22/00
[52] U.S. Cl. ..................... 528/328; 528/73; 528/53; 548/313
[58] Field of Search .......................... 528/73, 328, 53; 548/313

[56] References Cited

U.S. PATENT DOCUMENTS 3,903,053 9/1975 Iwata et al. ..................... 528/328

Primary Examiner—John Kight, III
Assistant Examiner—Duc Truong
Attorney, Agent, or Firm—Connolly and Hutz

[57] ABSTRACT

Polyhydantoins of the type mentioned may be prepared by reacting initially in a first step, bis-glycine esters with between 1 and 2 moles of diisocyanate per mole of bis-glycine ester in a liquid reaction medium, and after forming the polyurea from this bis-glycine ester and the diisocyanate, by further reacting in a second step with an amount of a monoglycine ester equivalent to the residual amount of isocyanate end groups, and finally by carrying out the cyclocondensation to give the polyhydantoin by removing hydroxyl compounds.

10 Claims, 1 Drawing Sheet

PROCESS FOR THE PREPARATION OF POLYHYDANTOINS WHICH CAN BE PROCESSED THERMOPLASTICALLY

The invention relates to a process for the preparation of thermoplastic polymers containing hydantoin groups, by reacting bis-glycine esters with diisocyanates in a first step to give polyureas, further reacting these polyureas in a second step using monoglycine esters as chain terminators, and final cyclocondensation while forming hydantoin groups.

Processes for the preparation of polyhydantoin plastics by reacting glycine ester derivatives and polyisocyanates are already known (for example U.S. Pat. No. 3,397,253). This procedure has subsequently been subject to numerous further variations, in which these polymers containing hydantoin groups were varied by adding or incorporating further functional groups, such as amide groups, imide groups or ester groups.

These polymers are hitherto used essentially only as wire insulation lacquers or impregnating resins for laminates, as a high degree of cross-linking takes place in the final moulding process. The occurrence of cross-linking is very desirable in the fields of application mentioned, as only then do the polymers acquire the required hardness and solvent resistance.

Thermoplastic processing of these polymers has not been possible hitherto for the same reasons, as there is an uncontrollable molecular mass build-up as a result of the cross-linking reactions which take place at the processing temperatures in injection moulding, or during extrusion (300°–360° C.).

It has now been found that polyhydantoin polymers, which no longer have reactive groups which facilitate cross-linking, can be prepared by using an excess of the diisocyanate component, even if it is only a slight excess, in conjunction with the specific use of monoglycine esters during the course of polyhydantoin preparation. These polymers can then be processed to form moulded bodies under the conditions which are typical for injection moulding or extrusion processing, without there being a molecular mass build-up during the processing phase.

So-called "melt hydantoins" are described in DE-OS No. 24 04 741, but they have a stable melt up to about 120° C. only as a primary resin. The reason for this lies in the blocking of the reactive end groups which are no longer effective at temperatures above 150° C.; after the de-blocking which then occurs, the reactive end groups are available again and lead to an insoluble polymer after subsequent cross-linking.

A process has now been found for the preparation of polyhydantoins; which can be processed thermoplastically; of the formula:

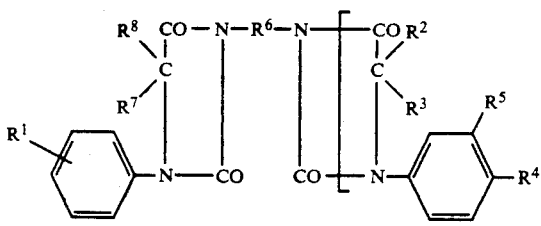
(I)

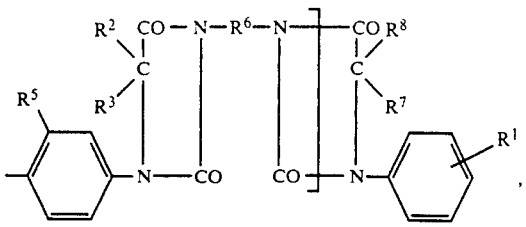

in which
R$^1$ denotes hydrogen or straight-chain or branched C$_1$–C$_{12}$-alkyl,
R$^2$ and R$^3$ independently of one another represent hydrogen or straight-chain or branched C$_1$–C$_6$-alkyl, or together denote $-\!\!+\!CH_2\!+\!_4$ or $-\!\!+\!CH_2\!+\!_5$ R$^4$ represents —CH$_2$—, —C(CH$_3$)$_2$, —CO—, —O— or —SO$_2$—,
R$^5$ denotes hydrogen or both R$^5$-substituents of neighbouring rings denote ring-forming —SO$_2$—,
R$^6$ represents the divalent radical of a straight-chain or branched aliphatic C$_2$–C$_{20}$ hydrocarbon, of a cycloaliphatic C$_5$–C$_{10}$ hydrocarbon, of an aromatic C$_6$–C$_{12}$ hydrocarbon or one of the groups:

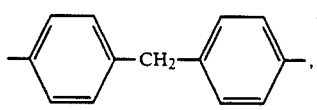

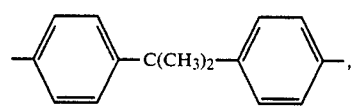

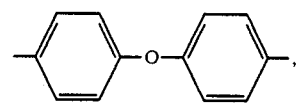

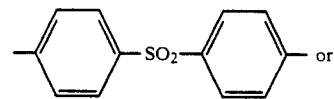

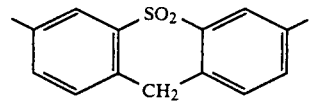

and
R$^7$ and R$^8$ independently of one another denote hydrogen or straight-chain or branched C$_1$–C$_{12}$-alkyl, which is characterised in that in a first step, bis-glycine esters of the formula:

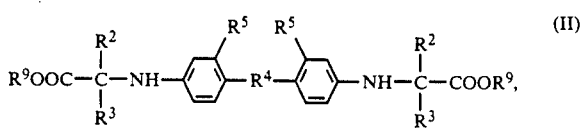
(II)

in which
R$^2$ to R$^5$ have the above meaning, and $R^9$ represents straight-chain or branched $C_1$-$C_{10}$-alkyl or $C_6$-$C_{10}$-aryl, are reacted with between 1 and 2 moles of diisocyanate of the formula $$OCN-R^6-NCO \qquad (III);$$

in which $R^6$ has the above meaning, per mole of bis-glycine ester in a liquid reaction medium, and after forming the polyurea from the bis-glycine ester and the diisocyanate, is reacted further in a second step with an amount of monoglycine ester of the formula:

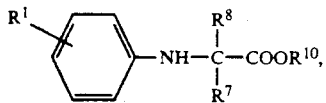
(IV)

in which $R^1$, $R^7$ and $R^8$ have the above meaning, and $R^{10}$ represents straight-chain or branched $C_1$-$C_{10}$-alkyl or $C_6$-$C_{10}$-aryl, equivalent to the residual amount of isocyanate end groups, to give a polyurea of the formula:

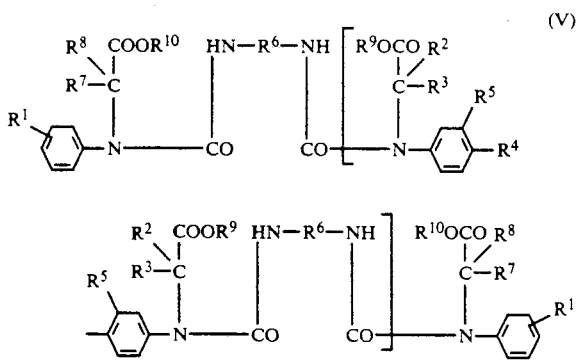
(V)

in which $R^1$ to $R^{10}$ have the above meaning, and finally, the cyclocondensation to give the polyhydantoin is carried out with removal of $R^9OH$ and $R^{10}OH$.

In a preferred manner, isocyanates of the formula $$OCN-R^{16}-NCO \qquad (VI)$$

are used, in which $R^{16}$ denotes one of the groups

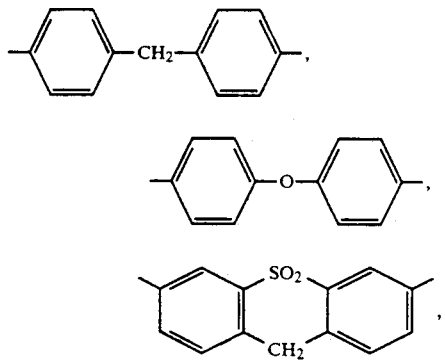

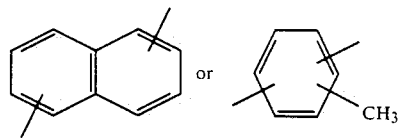

In a further preferred manner, bis-glycine esters of the above type, in which $R^2$ and $R^3$ are replaced by the radicals $R^{12}$ and $R^{13}$, which independently of one another denote hydrogen, methyl or ethyl, are used in the process of the invention.

Further bis-glycine esters preferred according to the invention, are those in which $R^4$ denotes one of the groups —$CH_2$—, —$C(CH_3)_2$— or —O—.

Still further bis-glycine esters preferred according to the invention, are those in which $R^5$ denotes hydrogen.

In preferred manner, monoglycine esters of the type described above are used, in which $R^7$ and $R^8$ are replaced by the radicals $R^{17}$ and $R^{18}$, which independently of one another denote hydrogen, methyl or ethyl.

In a further preferred manner, monoglycine esters of the type described are used, in which $R^1$ is replaced by $R^{11}$ which denotes hydrogen or $C_1$-$C_4$-alkyl, particularly preferably hydrogen.

Furthermore, it is within the scope of the invention to make use of all mixtures of several of those reactants to be used which come under the formulae (I), (II), (III) or (IV).

The polyhydantoins of the invention are characterised by the unit

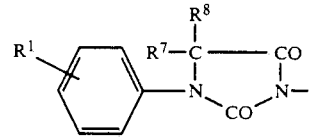

wherein $R^1$, $R^7$ and $R^8$ have the above-mentioned meaning and which deactivate the end groups for further undesirable (cross-linking) reactions. Furthermore, the molecular parts appearing in square brackets in the above formulae (I) and (V) are the recurring repeating units of polyhydantoin (or of polyurea as intermediate product).

In accordance with the invention, it is important to use the monoglycine ester only after the reaction between the bis-glycine ester and the diisocyanate is completed. Between 1 and 2 moles of the diisocyanate per mole of bis-glycine ester are used here, so that there is always an excess, if only a slight excess, of isocyanate groups compared to glycine ester groups. 1.01–1.5 moles are reacted in preferred manner, particularly preferred are 1.02–1.3 Moles, most particularly preferred are 1.02–1.1 moles of diisocyanate per mole of bis-glycine ester. The reaction products of the first process step thus always have isocyanate end groups. It is obvious to the expert that the chain length can be influenced by adjusting the above-mentioned molar ratios between diisocyanate and bis-glycine ester. A higher excess of diisocyanate gives numerous but shorter polymer chains having isocyanate end groups and vice versa. In the second step, as much monoglycine ester is then added as there are residual isocyanate end groups remaining from the first reaction step, so that finally all isocyanate end groups are deactivated.

The preparation of the glycine derivatives to be used as starting materials is known in principle and can be carried out, for example by direct reaction of the diamines of the formula:

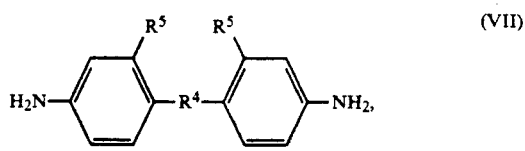

in which $R^4$ and $R^5$ have the above-mentioned meaning, with haloacetic acid or its derivatives.

The reaction with haloacetic acid or its derivatives takes place in organic solvents, for example in ethanol, methanol, acetone or benzene, or also in aqueous medium with co-use of acid binders, such as tertiary amines (pyridine, triethylamine and the like), excess starting amine, alkali carbonates, alkali hydrogen carbonates, alkali metal oxides, alkaline earth metal oxides, calcium carbonate or similar materials known to the expert for these purposes.

Examples of suitable haloacetic acid or its derivatives are chloroacetic acid, chloroacetate (with methyl, ethyl, phenyl or the like as ester group), α-chloropropionate or α-chloropropionic acid. Compounds of this type are obvious to the expert.

A further method for the preparation of bis-glycine esters consists in polymerising the diamines (VII) with cyanides, for example sodium cyanide or potassium cyanide and oxo-compounds (such as formaldehyde, acetone, cyclohexanone and the like) with addition of acids; the nitriles obtained can then be saponified to carboxylic acids in known manner, or can be converted directly to the ester using the required alcohol and acids, such as HCl.

Further processes consist in transforming glycine derivatives already prepared, for example, in esterification of the free acids or in transesterification.

The diisocyanates required for the preparation of polyhydantoins are those of the above formula (III), in which $R^6$ has the range of meanings mentioned.

Examples of this are polymethylene diisocyanates $OCN-(CH_2)_n-NCO$ with values for n of 2 to 20, preferably 4 to 8, optionally alkyl-substituted phenylene diisocyanates, such as m-phenylene diisocyanates, p-phenylene diisocyanates, toluylene-2,4-diisocyanate, toluylene-2,6-diisocyanate, ethylphenylene diisocyanates, di-isopropylphenylene diisocyanates, tri-isopropylphenylene diisocyanates, chloro-p-phenylene diisocyanates, diphenylmethane diisocyanates, naphthylene diisocyanates, diphenylether diisocyanates, or thioxanthene-S,S-dioxide diisocyanates, and cycloaliphatic diisocyanates, such as cyclohexane-1,4-diisocyanate or isophorone diisocyanate.

It is clear from the examples mentioned that all substituents $R^1$ to $R^{10}$ mentioned in the above formulae, may be substituted by lower alkyl groups and/or alkoxy groups, such as methyl, ethyl, propyl, isopropyl, butyl, isomeric butyl, methoxy, ethoxy, propoxy, isopropoxy, butoxy or isomeric butoxy, and by fluorine, chlorine or bromine.

The diisocyanates mentioned may also be used in the form of derivatives. In this connection, suitable examples of derivatives are the reaction products of diisocyanates of this type with compounds, such as phenols, alcohols, amines, ammonia, disulphide or HCl. Examples of individual representatives of compounds of this type which may be mentioned are: phenols, cresols, xylenols, ethanol, methanol, propanol, isopropanol, ammonia, methylamine, ethanolamine, dimethylamine, aniline, diphenylamine. In addition, higher molecular adducts, for example of diisocyanates with polyalcohols, such as ethylene glycol or propylene glycol, may also be used.

It is known in principle to link reactive end groups by means of monofunctional groups when preparing polymers which can be obtained by polycondensation. The molecular weight is thus adjusted to a desired degree at the same time ("chain terminators"). The conventional type of polycondensation is thus the simultaneous feeding of all reaction components, including the chain terminator, into the reaction vessel. However, a procedure of this type, which is otherwise conventional, only produces polymers in the present case whose melt viscosity increases sharply in the course of the measurement.

A viscosity increase of this type is obviously to be attributed to branching reactions of reactive end groups, which leads to build-up of molecular mass. Polyhydantoins of this type cannot be used for thermoplastic processing.

Surprisingly, polymers having a viscosity which remains stable even on prolonged stoving, are only obtained by adding the monoglycine ester (IV) after formation of the polyurea from bis-glycine esters and diisocyanates. Hence, thermoplastic processing by injection moulding or by extrusion, in which the polymer melt is subject to elevated temperature for a prolonged period, is possible.

The comparison of the two polyhydantoins mentioned is shown in FIG. 1, in which the melt volume (Intrinsic Melt Volume Index) of polyhydantoins stoved for different lengths of time shows the points of measurement. The stoving times in minutes are plotted on the abscissa and the resulting melt volume in $cm^3/10$ minutes on the ordinate. The values of the graph (1) thus show the approximately constant values of the polyhydantoin of the invention, whereas the values of the graph (2) show the sharply decreasing values of the melt volume (corresponds to a sharply increasing viscosity) of polyhydantoins, in which chain terminators had already been added at the start of polyurea formation.

The process of the invention is carried out in a liquid reaction medium, the quantity of which is 50 to 250 wt. %, relative to the weight of the expected polyhydantoin. Suitable materials for such a liquid reaction medium must be inert to the reactants. Materials of this type are known to the expert. They are preferably cyclic, N-substituted acid amides, such as N-alkylpyrrolidones, also dimethylsulphoxide, phenol, cresols, xylenols, aliphatic or aromatic hydrocarbons, aliphatic or aromatic halohydrocarbons, esters, ketones, open-chained dialkylcarboxylic acid amides, condensed aromatic hydrocarbons or a mixture of several of them. N-alkylpyrrolidones, dimethylsulphoxide, phenol, cresols, xylenols, dimethylformamide, condensed aromatic hydrocarbons or a mixture of several of them may be particularly preferably mentioned, wherein the individual materials or a mixture formed from them may additionally contain aromatic hydrocarbons, such as toluene or xylenes. Many of the reaction media mentioned dissolve the polymer. The reaction medium can therefore be distilled off to leave the polymer. The polymer can also be removed by adding a precipitation agent. Precipitation agents of this type are, for example aliphatic alcohols, such as methanol, ethanol and propanol, or even water for reaction media which are miscible with water. Precipitation of this type is easy, as the polyhydantoin prepared in accordance with the invention does not contain free isocyanate groups.

However, a series of the reaction media mentioned, predominantly the hydrocarbons or halohydrocarbons, do not dissolve the polymer. The polyhydantoin therefore precipitates from reaction media of this type and can be recovered by filtration. The condensed aromatic hydrocarbons, such as naphthaline, anthracene and phenanthrene and their derivatives with lower alkyl groups and/or halogens in particular, may be mentioned under the reaction media. Condensed aromatic materials of the formula:

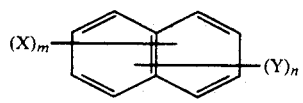

(VIII)

may be mentioned in particular, in which
X and Y independently of one another denote straight-chain or branched $C_1$-$C_6$-alkyl or $C_1$-$C_6$-alkoxy, phenyl or chlorine, and
m and n independently of one another assume the value zero, one or two.

The process of the invention is carried out at temperatures in the range 0°–500° C., preferably 20°–350° C. There is a transition from initially lower temperature values to higher values at the end during the whole of the execution of the process of the invention. Hence, for example the first step is carried out at 0°–80° C., preferably 20°–50° C., the second step at 0°–80° C., preferably 20°–50° C., and the third step at 80°–500° C., preferably 80°–300° C. The process of the invention is largely independent of the external pressure. It is possible to fall back on a higher pressure to keep a reaction medium of this type in liquid state in a manner known to the expert, when using reaction media having a low boiling point.

The final step of the process of the invention, namely the cyclocondensation to give the polyhydantoins, can be accelerated by co-using metal alcoholates, such as sodium methylate, sodium ethylate, titanium tetrabutylate and the like, or tertiary amines, such as triethylamine, endoethylenepiperazine and the like, as catalysts.

The polyhydantoins prepared in accordance with the invention are plastics which are resistant to high temperature and which remain stable up to about 450° C. and have excellent mechanical properties. They may contain the additives conventional for plastics, such as fillers, pigments, antioxidants, plasticisers and others. In addition, other polymers, such as polyesters, polyamides, polyurethanes, polyolefins, polyacetals, polyepoxides, polyimides, polyamideimides, polyimino-polyesters and/or polyimido-isocyanates may be added to the polyhydantoins which can be prepared in accordance with the invention, wherein the spectrum of properties may be adapted to further requirements.

The polyhydantoins which can be prepared in accordance with the invention are particularly suitable for the manufacture of thermally stable moulded bodies, such as fibres, filaments, films (by casting techniques or by extrusion) and solid moulded bodies, as can be manufactured by extrusion or injection moulding techniques. The invention therefore also relates to the use of polyhydantoins which can be prepared in accordance with the invention, for moulded bodies of the type mentioned and these moulded bodies made from the polyhydantoins prepared in accordance with the invention themselves.

A variety of waste is produced in the moulding process, side cuttings (for films), injection flash (injection moulding process) and others. Attempts are now made to recycle such waste to the moulding process, as this effects considerable savings in cost. This is now easily possible because of the excellent thermoplastic properties of the polyhydantoins prepared in accordance with the invention, as shown in FIG. 1. The invention therefore particularly relates to the use of polyhydantoins prepared in accordance with the invention, to form moulded bodies which are manufactured by extrusion or injection moulding techniques, and moulded bodies of this type themselves.

Moulded bodies which are resistant to high temperature are used, inter alia, in the electrical and electronics industry, and in air and space travel technology.

EXAMPLES

Example 1

40.5 g of 4,4'-bis-(methoxycarbonyl-2-propyl)-diaminodiphenylmethane (98.4% strength) were dissolved in 64 g of cresol and 20 g of toluene, and 27.03 g of 4,4'-diisocyanato-diphenylmethane were introduced at 40° C. After stirring for 4 hours at 35°–40° C., 2.44 g of methyl anilino-i-butyrate were added and stirred for 12 hours at 40° C. After adding 0.1 g of triethylenediamine, the mixture was cyclocondensed for 6 hours at 100° C. After cooling, a sample was taken and diluted to a solids content of about 15% by adding cresol. This sample solution was dried on a glass plate at 300° C. The polymer film obtained which was easily removed, was completely soluble in methylene chloride and gave a clear solution (no cross-linking). The remaining polymer solution was diluted using 0.1 liter of methylene chloride and precipitated by introducing into 1 liter of methanol. After drying, 61 g of white polymer were obtained having the following characteristics:

$\eta_{rel}$ (25° C.): 1.76 (1% in cresol).

$T_G$: 240° C.

MVI (5 kg load) at 320° C.: 3.43 ml/10 minutes; 340° C.: 6.17 ml/10 minutes.

IMVI (5 kg load, 340° C.) after stoving for
5 minutes: 12.5 ml/10 minutes
10 minutes: 7.2 ml/10 minutes
15 minutes: 7.7 ml/10 minutes
20 minutes: 7.1 ml/10 minutes MVI = short measurement; Duration: 5 minutes.
IMVI = long measurement; Duration: 20 minutes.

Example 2 (for comparison)

191 g of 4,4'-bis-(methoxycarbonyl-2-propyl)-diaminodiphenylmethane (98.4% strength) and 7.7 g of methyl anilino-i-butyrate were dissolved in 256 g of cresol 70 (=technical cresol mixtures 70% m-cresol) and 100 g of toluene (absolute); 125 g of 4,4'-diisocyanatodiphenylmethane were introduced into this at 40° C. It was stirred for 12 hours at 40° C. After adding 0.5 g of DABCO, the mixture was cyclocondensed for 6 hours at 200° C. After cooling, a sample was taken and diluted to a solids content of 15% by adding cresol. This solution was coated onto a degreased glass plate and stoved for 20 minutes at 200° C. and 10 minutes at 300° C. The polymer film obtained was then still only partially soluble in methylene chloride (gel particles).

The remaining polymer solution was diluted using 1 liter of toluene and precipitated in 6 liters of methanol. After drying, 257 g of white polymer powder, which showed the following IMVI values at 330° C. analogously to Example 1, were obtained:
at 5 minutes: 82.1 ml/10 minutes
at 10 minutes: 50.2 ml/10 minutes
at 15 minutes: 16.6 ml/10 minutes
at 20 minutes: 5.0 ml/10 minutes.

Example 3

371 g of 4,4'-bis-(methoxycarbonyl-2-propyl)-diaminodiphenylmethane (98.4% strength) were dissolved in 600 g of cresol and 180 g of toluene; 247.6 g of 4,4'-diisocyanato-diphenylmethane were introduced into this at 40° C. After stirring for 4 hours at 35°-40° C., 22.4 g of methyl anilino-i-butyrate were added and the mixture was stirred for 12 hours at 40° C. After adding 0.9 g of triethylenediamine, the mixture was cyclocondensed for 6 hours at 100° C. After cooling, a sample was taken and diluted to a solids content of about 15% by adding cresol. This solution was dried on a glass plate at 300° C. The polymer film obtained which was easily removed, was completely soluble in methylene chloride and gave a clear solution (no cross-linking).

The remaining polymer solution was diluted using 3 liters of methylene chloride and precipitated in 4 liters of methanol. After drying, 566 g of white polymer having the following properties were obtained:
$\eta_{rel}$ (25° C.): 1.84 (1% in cresol) and
MVI: 6.78 (5 kg load, 340° C.).

Example 4

405 g of 4,4'-bis-(methoxycarbonyl-2-propyl)-diaminodiphenylmethane (98.4% strength) were dissolved in 640 g of cresol and 200 g of toluene; 272.8 g of 4,4'-diisocyanato-diphenylmethane were introduced into this at 40° C. After stirring for 4 hours at 35° to 40° C., 28.31 g of methyl anilino-i-butyrate were added and the mixture was stirred for 12 hours at 40° C. After adding 1 g of triethylenediamine, the mixture was cyclocondensed for 6 hours at 200° C. After cooling, a sample was taken and diluted to a solids content of about 15% by adding cresol.

This solution was dried on a glass plate at 300° C. The polymer film obtained which was easily removed, was completely soluble in methylene chloride and gave a clear solution (no cross-linking).

The remaining polymer solution was diluted using 2 liters of methylene chloride and precipitated in 10 liters of methanol. After drying, 598 g of white polymer having the following properties were obtained:
$\eta_{rel}$ (25° C.): 1.85 (1% in cresol).
MVI (5 kg load, 340° C.): 3.03 ml/10 minutes.
IMVI (5 kg load, 340° C.) after stoving for
5 minutes: 2.66 ml/10 minutes
10 minutes: 2.58 ml/10 minutes
15 minutes: 2.01 ml/10 minutes
20 minutes: 1.02 ml/10 minutes.

Example 5

Injection Moulding Processing

The polymer from Example 4 was melted in an extruder at 330° C. and then granulated. These granules were processed to form small standardised rods using an Arberg mini-injection moulding machine at a temperature of 330° C. and a mould temperature of 80° C. The following nominal values were determined using the bending test according to DIN 53 457 on the small rods:

| | |
|---|---|
| Bending stress at 3.5% edge fibre extension | 83.1 [$N/mm^2$] |
| Bending stress at maximum force | 120 [$N/mm^2$] |
| Bending modulus of elasticity | 2,472 [$N/mm^2$] |

What is claimed is:

1. Process for the preparation of polyhydantoins which can be processed thermoplastically of the formula:

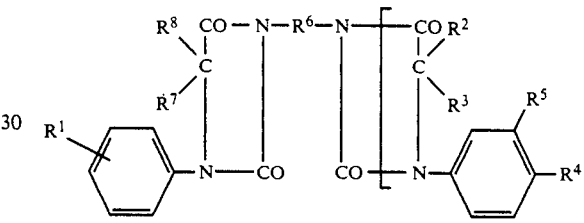

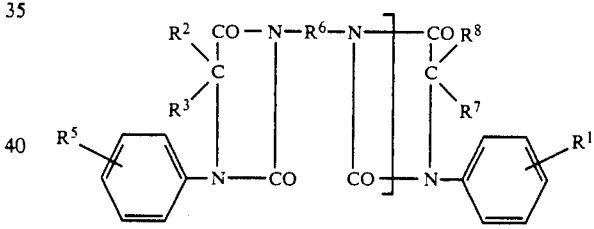

in which
$R^1$ denotes hydrogen or straight-chain or branched $C_1$-$C_{12}$-alkyl,
$R^2$ and $R^3$ independently of one another represent hydrogen or straight-chain or branched $C_1$-$C_6$-alkyl, or together denote $+CH_2+_4$ or $+CH_2+_5$ $R^4$ represents —$CH_2$—, —$C(CH_3)_2$, —CO—, —O— or —$SO_2$—,
$R^5$ denotes hydrogen, or both $R^5$-substituents of neighbouring rings denote ring-forming —$SO_2$—,
$R^6$ represents the divalent radical of a straight-chain or branched aliphatic $C_2$-$C_{20}$ hydrocarbon, of a cycloaliphatic $C_5$-$C_{10}$ hydrocarbon, of an aromatic $C_6$-$C_{12}$ hydrocarbon or one of the groups:

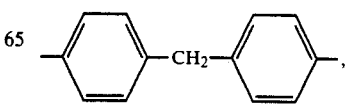

-continued

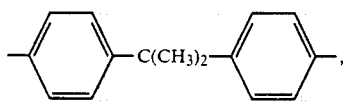

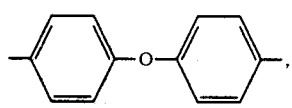

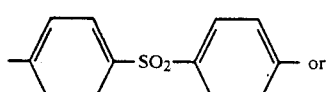 or

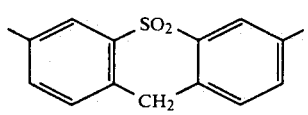

and

R$^7$ and R$^8$ independently of one another denote hydrogen or straight-chain or branched C$_1$-C$_{12}$-alkyl, characterised in that in a first step, bis-glycine esters of the formula:

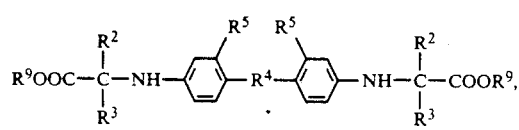

in which

R$^2$ to R$^5$ have the above meaning, and

R$^9$ represents straight-chain or branched C$_1$-C$_{10}$-alkyl or C$_6$-C$_{10}$-aryl, are reacted with between 1 and 2 moles of diisocyanate of the formula:

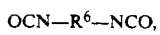

in which R$^6$ has the above meaning, per mole of bis-glycine ester in a liquid reaction medium, and after forming the polyurea from the bis-glycine ester and the diisocyanate, is reacted further in a second step with an amount of monoglycine ester of the formula:

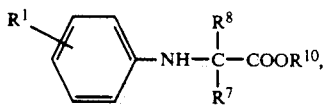

in which

R$^1$, R$^7$ and R$^8$ have the above meaning, and

R$^{10}$ represents straight-chain or branched C$_1$-C$_{10}$-alkyl or C$_6$-C$_{10}$-aryl, equivalent to the residual amount of isocyanate end groups, to give a polyurea of the formula:

(V)

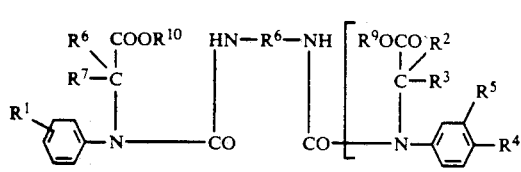

-continued

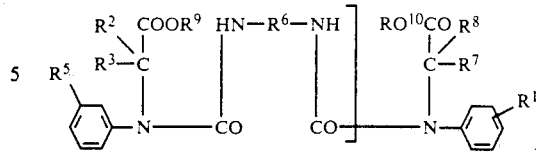

in which

R$^1$ to R$^{10}$ have the above meaning, and finally, the cyclocondensation to give the polyhydantoin is carried out with removal of R$^9$OH and R$^{10}$OH.

2. Process according to claim 1, characterised in that isocyanates of the formula:

$$OCN—R^{16}—NCO \quad (VI)$$

are used, in which

R$^{16}$ denotes one of the groups:

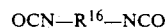

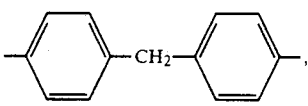

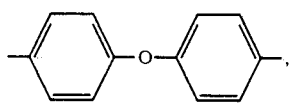

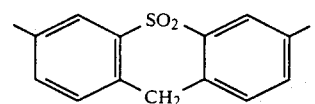

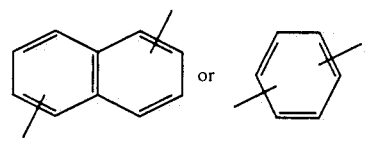 .

3. Process according to claim 1, characterised in that bis-glycine esters according to claim 1 are used, in which R$^2$ and R$^3$ are replaced by the radicals R$^{12}$ and R$^{13}$, which independently of one another denote hydrogen, methyl or ethyl.

4. Process according to claim 1, characterised in that monoglycine esters according to claim 1 are used, in which R$^7$ and R$^8$ are replaced by the radicals R$^{17}$ and R$^{18}$, which independently of one another denote hydrogen, methyl or ethyl.

5. Process according to claim 1, characterised in that 1.01–1.5 moles, preferably 1.02–1.3 moles, particularly preferably 1.02–1.1 moles of diisocyanate are reacted per mole of bis-glycine ester.

6. Process according to claim 1, characterised in that N-alkylpyrrolidones, dimethylsulphoxide, phenol, cresols, xylenols, aliphatic or aromatic hydrocarbons, aliphatic or aromatic halohydrocarbons, esters, ketones, dialkylcarboxylic acid amides, condensed aromatic hydrocarbons or a mixture of several of them, preferably N-alkylpyrrolidones, dimethylsulphoxide, phenol, cresols, xylenols, dimethylformamide, condensed aromatic hydrocarbons or a mixture of several of them or a mixture of the materials mentioned with aromatic hydrocarbons, are used as liquid reaction medium.

7. Process according to claim 6, characterised in that condensed aromatic hydrocarbons of the formula:

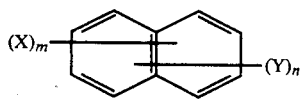

in which

X and Y independently of one another denote straight-chain or branched $C_1$-$C_6$-alkyl or $C_1$-$C_6$-alkoxy, phenyl or chlorine, and m and n independently of one another assume the value zero, one or two, are used as liquid reaction medium.

8. Process according to claim 1, characterised in that it is carried out at 0°-500° C., preferably 20°-350° C.

9. Temperature-resistant moulded bodies made from polyhydantoins according to claim 1.

10. Temperature-resistant moulded bodies according to claim 9, which are manufactured by extrusion or injection moulding techniques.

* * * * *